Feb. 16, 1943.  A. G. ROSE  2,311,577
MECHANISM FOR DELIVERING ARTICLES FROM MACHINES
Filed March 5, 1941  2 Sheets-Sheet 1
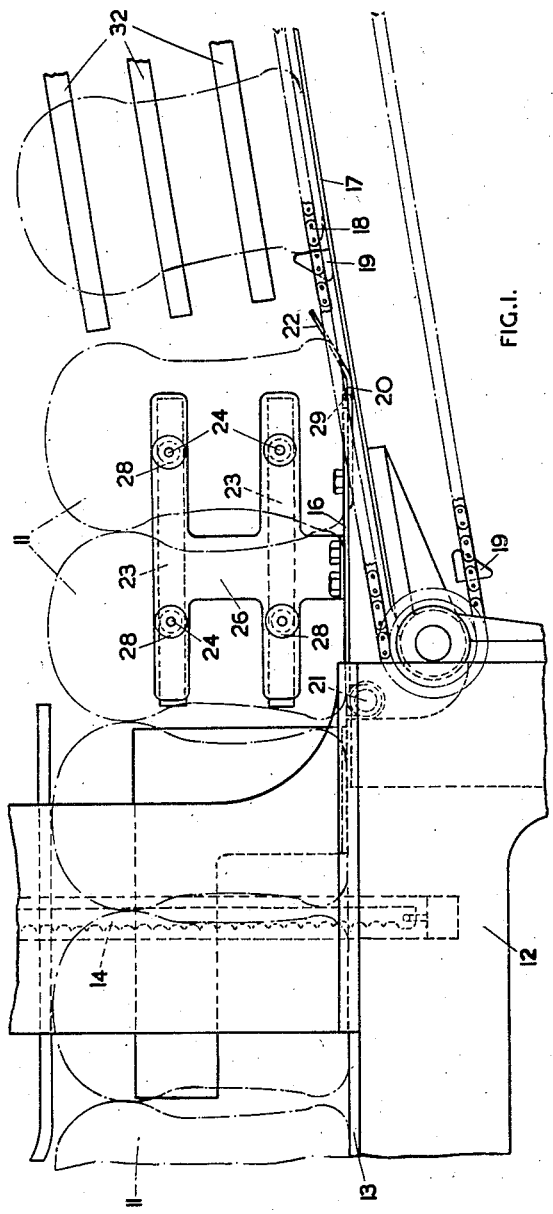
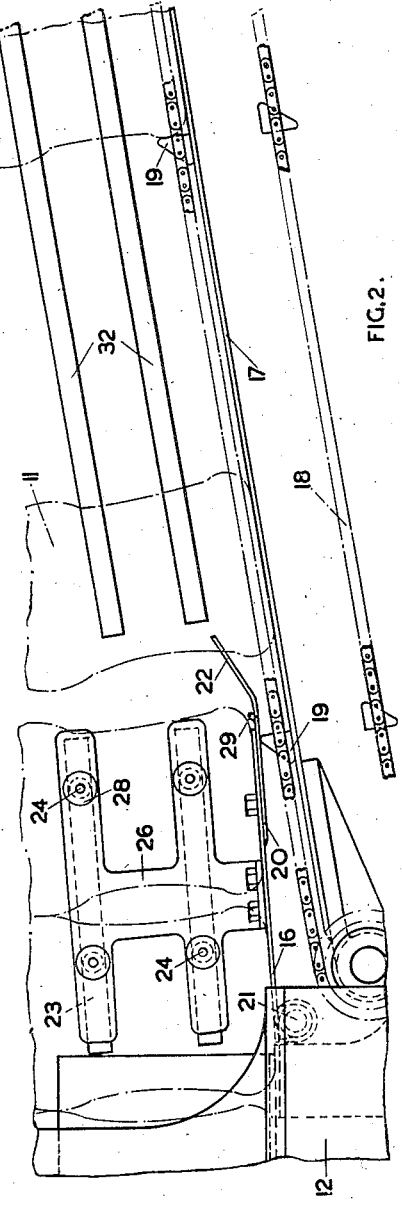
INVENTOR:
A.G. ROSE.
BY
*Munn, Anderson & Liddy*
ATTORNEYS.

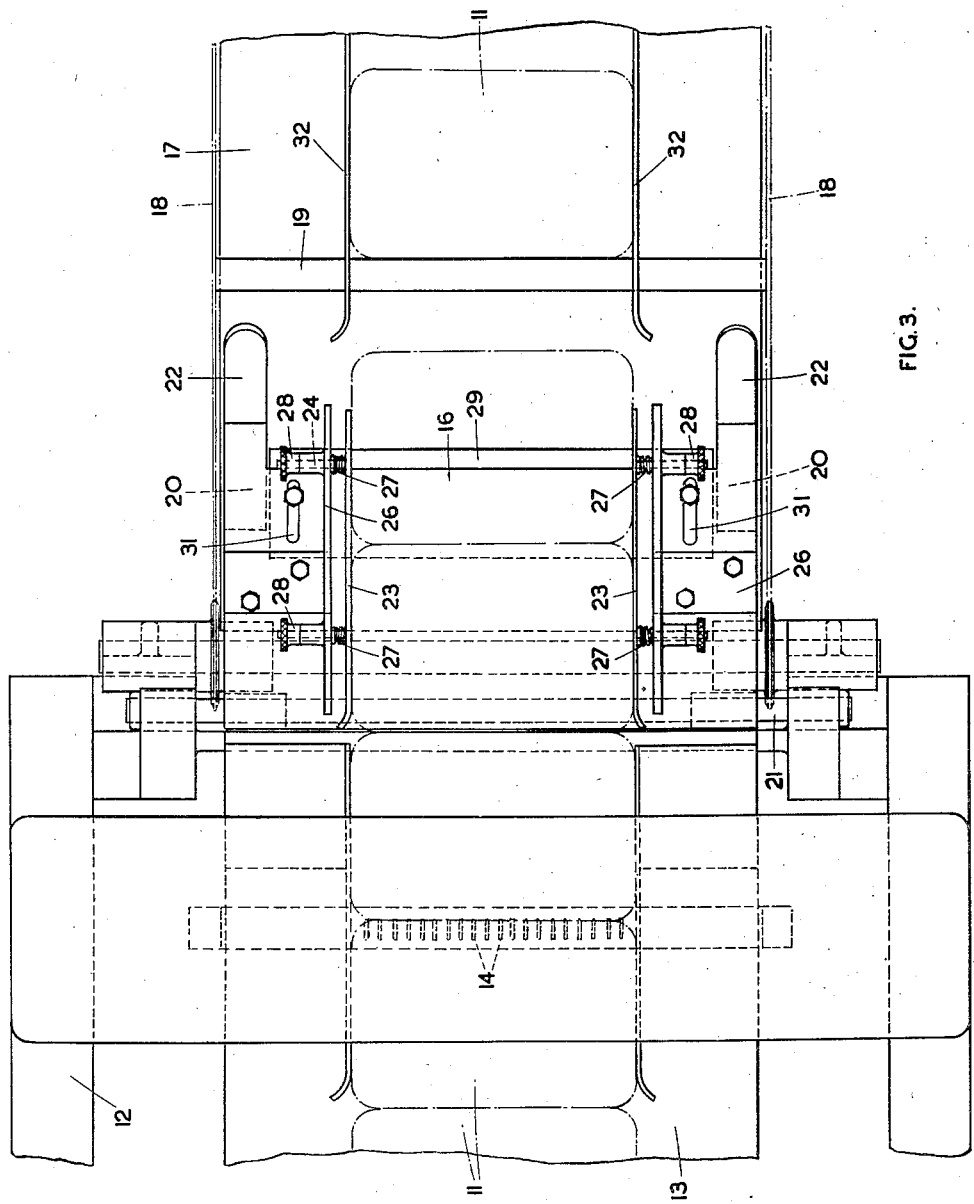

Patented Feb. 16, 1943

2,311,577

UNITED STATES PATENT OFFICE 2,311,577

MECHANISM FOR DELIVERING ARTICLES FROM MACHINES

Alfred German Rose, Gainsborough, England, assignor to Rose Brothers (Gainsborough) Limited, Gainsborough, England, a British company Application March 5, 1941, Serial No. 381,814
In Great Britain April 29, 1940

10 Claims. (Cl. 198—23)

This invention relates to apparatus of the type in which articles, for example, loaves of bread, are delivered contiguously from an apparatus for operating on the articles, for example, a slicing apparatus, to a conveyor, of the type comprising one or more pusher bars extending across an article-supporting surface and each adapted to engage the rear face of an article, which transports the articles to another apparatus for operating on the articles, for example, a wrapping apparatus.

According to the present invention, an apparatus of the type described comprises a delivery plate arranged to receive the articles and along which the articles pass to the article-supporting surface of the conveyor, the delivery plate being so disposed that it extends over the conveyor with its forward edge lying at substantially the same level as the said surface and adapted to rock about an axis parallel to and extending transversely of the said surface, and means for rocking the delivery plate about its axis upon delivery of each article on to said surface to raise the forward edge of the delivery plate so as to allow a pusher bar of the conveyor to move into engagement with the rear face of each article delivered, said rocking means being arranged to maintain the forward edge of the delivery plate in its elevated position until the pusher bar has moved clear of the path taken by the lower forward edge of the next succeeding loaf as the delivery plate returns to its normal level.

The pusher bars themselves may conveniently act as the rocking means, the bars moving into engagement with the under side of the delivery plate and lifting its front edge as they pass beneath it, and in such a case there is provided on the delivery plate, outside the path of the articles, but in the path of the pusher bars, a projection extending from the forward edge of the delivery plate and allowing the pusher bars to maintain the forward edge of the delivery plate in its elevated position after the pusher bar has moved beyond that edge. Preferably, the forward portion of the projection is inclined upwardly to allow for the gradual lowering of the delivery plate as the pusher bar moves forward. If desired, a projection may be formed on each side of the delivery plate to give greater support for the plate.

As an additional precaution against the front edge of the articles catching on the pusher bar, the portion or portions of the pusher bar engaging with the projection or projections on the delivery plate may be slightly higher than the normal level of the pusher bar so as to raise the delivery plate above the normal level of the pusher bar.

When the articles are delivered to the conveyor in an intermittent manner, it is desirable that the length of the delivery plate should be such as to allow the forward face of an article about to be delivered slightly to overhang the forward edge of the delivery plate so that, when the articles are moved forward, the forward article is pushed completely off the delivery plate leaving the next succeeding article slightly overhanging. It will be understood, however, that it is important that the degree of overhang should not be sufficient to leave the articles in danger of tipping over the forward edge of the delivery plate when it is lifted. Conveniently, therefore, the forward edge of the delivery plate is made adjustable so as to accommodate articles of different sizes.

The invention is particularly applicable to apparatus for the slicing and wrapping of loaves of bread, and by way of example, the invention will now be described in greater detail as applied to such an apparatus, with reference to the accompanying diagrammatic drawings, in which:

Figure 1 is an elevation of part of a bread slicing and wrapping machine employing an apparatus according to the invention, Figure 2 is a similar elevation to that shown in Figure 1, showing the delivery plate in its elevated position, and Figure 3 is a plan view of the apparatus shown in Figure 1.

Loaves of bread 11 are fed in a positive manner to a slicing apparatus generally indicated by reference numeral 12, each loaf being pushed along a feeding platform 13 through slicing knives 14 and along a delivery plate 16 by the next succeeding loaf. The loaves are received from the delivery plate 16 by a loaf-supporting platform 17 along which is arranged to travel a conveyor consisting of a pair of parallel chains 18 carrying pusher bars 19, the pusher bars engaging the rear faces of the loaves and transporting them along the supporting platform 17 to the wrapping mechanism (not shown). The loaf-feeding mechanism, conveyor and wrapping mechanisms are driven in synchronism so that for each loaf fed to the slicing mechanism a wrapped loaf is delivered from the wrapping mechanism. The loaf-feeding mechanism feeds each loaf separately and there occurs a slight lag after each loaf is fed until the next succeeding loaf is fed and pushed against the preceding one, the lag resulting in the loaves being pushed off the end of the delivery plate 16 intermittently.

The delivery plate 16 is pivotally mounted on the slicing apparatus 12 about an axis 21 extending transversely of the path of the loaves. The delivery plate extends over the conveyor, which is inclined upwardly towards the forward edge of the delivery plate, and is so disposed that its forward edge normally lies on the supporting platform 17. Attached to the forward portion of the delivery plate 16 at positions outside the path of the loaves 11 and within the path of the pusher bars 19 are a pair of members 20 having projecting portions 22 extending forwardly of the forward edge of the delivery plate 16 and having the greater part of their length inclined upwardly.

Also mounted on the delivery plate 16 is a pair of guiding members each consisting of a pair of plates 23 carried on pins 24 supported in a bracket 26 attached to the delivery plate 16. Springs 27 are provided on the pins 24 for urging the plates 23 into contact with the loaves and adjusting nuts 28 are provided for adjusting the spring pressure.

The length of the delivery plate 16 is such that, when the loaves are stationary between the loaf-feeding operations, the loaf about to be delivered on to the platform 17 has its forward edge slightly overhanging the front edge of the delivery plate (see Figure 2), so that when the loaves move forward under the influence of a further loaf being fed to the slicing apparatus, the forward loaf on the delivery plate 16 is pushed right off the delivery plate on to the supporting platform 17 leaving the next loaf slightly overhanging. In order to maintain this setting for loaves of different width the forward portion of the delivery plate 16 is made as a separate piece 29 and is attached to the delivery plate 16 by means of bolts passing through slots 31.

In operation, the loaves pass through the slicing knives 14 on to the delivery plate 16 as mentioned above, and as each loaf is pushed off the delivery plate 16 on to the supporting platform 17, the delivery plate 16 is caused to rock upwardly about its pivot 21 by the action of a pusher bar 19 on the members 20, the delivery plate remaining in its elevated position until the pusher bar 19 reaches the inclined portions of the projections 22. The pusher bar 19 thus passes below the loaves on the delivery plate 16 and into contact with the rear face of the loaf just delivered on to the supporting platform 17, the projecting portions 22 of the members 20 ensuring that the delivery plate remains in its elevated position until the pusher bar 19 has moved out of the path taken by the forward edge of the next succeeding loaf as the delivery plate returns to its normal level. The inclined portions of the projections 22 allow the delivery plate 16 to return gradually to its original position as the pusher bar moves along those portions.

The sliced loaf just delivered is then moved forward along the supporting platform 17 between resilient side guides 32 by the pusher bar 19 to the wrapping mechanism. This sequence of operations is repeated for each loaf delivered from the slicing apparatus.

I claim:

1. An apparatus for discharging articles from a machine operating on the articles, comprising a conveyor having a series of spaced transverse pusher bars, an article-supporting surface disposed below the pusher bars, a delivery plate arranged to receive the articles and along which the articles pass to the article-supporting surface of the conveyor, the delivery plate being so disposed that it extends over the conveyor in the same general direction as that in which the articles travel on the conveyor and lies with its lower forward edge normally in close proximity to said surface so as to form with said surface a substantially continuous surface, and means for rocking the delivery plate about an axis parallel to and extending transversely of the said surface following the delivery of an article on to said surface to raise the forward edge of the delivery plate so as to allow a pusher bar of the conveyor to move into engagement with the rear face of each article delivered, said rocking means being arranged to maintain the forward edge of the delivery plate in its elevated position until the pusher bar has moved clear of the path taken by the lower forward edge of the next succeeding article as the delivery plate returns to its normal level.

2. Apparatus for delivering sliced loaves of bread or similar material from a slicing mechanism to a discharge conveyor, comprising a conveyor having a series of spaced transverse pusher bars carried by a pair of parallel chains, a loaf-supporting surface disposed between the chains and below the pusher bars, a delivery plate arranged to receive the sliced loaves from the slicing mechanism in contiguous relationship and along which the loaves pass to the loaf-supporting surface, the delivery plate being so disposed that it extends over the conveyor in the same general direction as that in which the loaves are moved by the conveyor and lies with its lower forward edge normally in close proximity to said surface so as to form with said surface a substantially continuous surface, said delivery plate being freely pivoted about an axis parallel to and extending transversely of the said surface and arranged so that upon delivery of each loaf on to the said surface said plate will be rocked about its axis by the action of a pusher bar moving into engagement with its underside as the pusher bar passes beneath it so as to allow the pusher bar to move into engagement with the rear face of the loaf just delivered, and a projection extending from the forward edge of the delivery plate at a position outside the path of the loaves to allow the pusher bar to maintain the forward edge of the delivery plate in its elevated position until the pusher bar has moved clear of the path taken by the lower forward edge of the next succeeding loaf as the delivery plate returns to its normal level.

3. Apparatus according to claim 2, wherein the forward portion of the projection is inclined upwardly to allow for the gradual lowering of the delivery plate as the pusher bar moves forward.

4. Apparatus according to claim 2, comprising a pair of projections extending from the forward edge of the delivery plate at positions outside the path of the loaves.

5. Apparatus for delivering sliced loaves of bread or similar material from a slicing mechanism to a discharge conveyor, comprising a conveyor having a series of spaced transverse pusher bars carried by a pair of parallel chains, a loaf-supporting surface disposed between the chains and below the pusher bars, a delivery plate arranged to receive the sliced loaves from the slicing mechanism in contiguous relationship and along which the loaves pass to the loaf-supporting surface, the delivery plate being so disposed that it extends over the conveyor in the same general direction as that in which the loaves are moved by the conveyor and lies with its lower forward edge normally in close proximity to said surface so as to form with said surface a substantially continuous surface, said delivery plate being freely pivoted about an axis parallel to and extending transversely of the said surface and arranged so that upon delivery of each loaf on to the said surface said plate will be rocked about its axis by the action of a pusher bar moving into engagement with the underside as the pusher bar passes beneath it so as to allow the pusher bar to move into engagement with the rear face of the loaf just delivered, and a pair of projections extending from the forward edge of the delivery plate at positions one on each side of the path of the loaves to allow the pusher bar to maintain the forward edge of the delivery plate in its elevated position until the pusher bar has moved clear of the path taken by the lower forward edge of the next succeeding loaf as the delivery plate returns to its normal level, the forward portion of each of said projections being inclined upwardly to allow for the gradual lowering of the delivery plate as the pusher bar moves forward.

6. Apparatus according to claim 1, wherein the front edge of the delivery plate is adjustable so as to accommodate articles of different dimensions considered in the direction of travel of the conveyor.

7. Apparatus according to claim 5, wherein the front edge of the delivery plate is adjustable so as to accommodate loaves of different width.

8. Apparatus according to claim 1, comprising a pair of resilient side guides mounted on the delivery plate and adapted to engage the articles as they pass along the delivery plate.

9. Apparatus according to claim 2, comprising a pair of resilient side guides mounted on the delivery plate and adapted to engage the loaves as they pass along the delivery plate.

10. Apparatus for delivering sliced loaves of bread or similar material from a slicing mechanism to a discharge conveyor, comprising a conveyor having a series of spaced transverse pusher bars carried by a pair of parallel chains, a loaf-supporting surface disposed between the chains and below the pusher bars, a delivery plate arranged to receive the sliced loaves from the slicing mechanism in contiguous relationship and along which the loaves pass to the loaf-supporting surface, the delivery plate being so disposed that it extends over the conveyor in the same general direction as that in which the loaves are moved by the conveyor and lies with its lower forward edge normally in close proximity to said surface so as to form with said surface a substantially continuous surface, said delivery plate being freely pivoted about an axis parallel to and extending transversely of the said surface and arranged so that upon delivery of each loaf on to the said surface said plate will be rocked about its axis by the action of a pusher bar moving into engagement with its underside as the pusher bar passes beneath it so as to allow the pusher bar to move into engagement with the rear face of the loaf just delivered, a pair of projections extending from the forward edge of the delivery plate at positions one on each side of the path of the loaves to allow the pusher bar to maintain the forward edge of the delivery plate in its elevated position until the pusher bar has moved clear of the path taken by the lower forward edge of the next succeeding loaf as the delivery plate returns to its normal level, the forward portion of each of said projections being inclined upwardly to allow for the gradual lowering of the delivery plate as the pusher bar moves forward, and a pair of resilient side guides mounted on the delivery plate and adapted to engage the loaves as they pass along the delivery plate.

ALFRED GERMAN ROSE.